Sept. 9, 1958     F. E. TAYLOR     2,851,580
METHOD OF CUTTING-OFF AND SEALING TUBING
Filed March 6, 1956
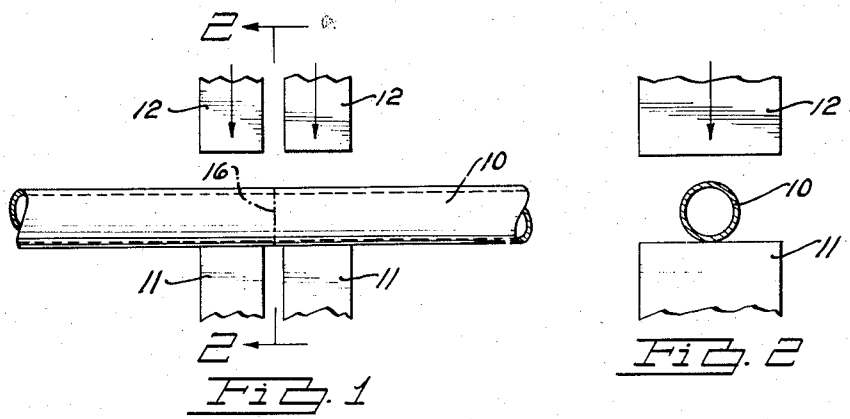
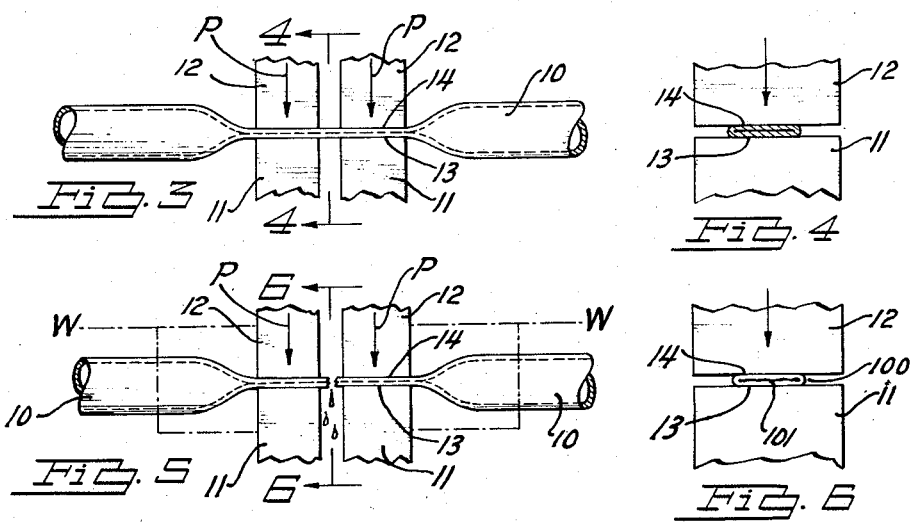
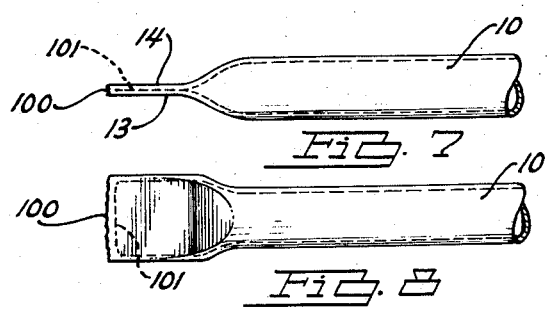
INVENTOR.
FLOYD E. TAYLOR
BY
ATTORNEY 2,851,580

METHOD OF CUTTING-OFF AND SEALING TUBING

Floyd E. Taylor, Bloomfield Hills, Mich., assignor to Swift Electric Welder Company, a corporation of Michigan Application March 6, 1956, Serial No. 569,897

2 Claims. (Cl. 219—68)

This invention relates to an improved and simplified method of cutting-off and sealing tubing such as copper tubing as used in refrigerator coils, and the like.

In the prior art there have been many and various methods employed to cut-off and bind together the loose or frayed ends of stranded cables and to cut-off rods, tubing and the like. The present methods employed to accomplish such cut-offs by heating tubing electrically combined with pinching off the tube while being held between electrodes or twisting or upsetting the cut-off ends while heated has proven unsatisfactory in high production. Also, the simultaneous cutting-off and sealing the cut-off ends of tubing in high production has heretofore been considered impractical because of not being able to obtain a uniformly positive seal at the cut-off ends of the tubing.

Accordingly, it is the primary object of this invention to provide an improved method for cutting-off and sealing the cut-off ends of copper tubing and the like in a single production operation wherein the sealing of the cut-off tube ends is complete and positive, and fully as pressure resistant as the tube itself.

Other objects of the invention will become apparent by reference to the following detailed description taken in connection with the accompanying drawing, in which:

Fig. 1 is a diagrammatic elevational view showing a piece of tubing positioned on the stationary electrodes of laterally spaced pairs of electrodes ready for cut-off and sealing.

Fig. 2 is a cross sectional view taken on the line 2—2 of Fig. 1.

Fig. 3 is a diagrammatic view similar to Fig. 1 except the movable electrodes have traveled downwardly and flattened the tubing.

Fig. 4 is a cross sectional view taken on the line 4—4 of Fig. 3.

Fig. 5 is a diagrammatic view similar to Fig. 3 showing welding current applied to the electrodes and the tubing cut-off and sealed.

Fig. 6 is a cross sectional view taken on the line 6—6 of Fig. 5.

Figs. 7 and 8 are side elevational and plan views respectively of a piece of tubing cut-off and sealed according to the improved method.

Referring now to the drawings wherein like numerals refer to like and corresponding parts throughout the several views, the improved method of cutting-off and sealing the cut-off ends of copper tubing or the like 10 comprises the placing of a length of tubing 10 on flat or substantially flat stationary electrodes 11 of laterally spaced pairs of electrodes, each pair of electrodes consisting of one stationary electrode 11 and one movable electrode 12, flattening the said tubing 10 between the said laterally spaced pairs of electrodes by moving the said movable electrodes 12 against the tubing 10 with sufficient pressure P to completely flatten the said tubing 10 so that the upper and lower flattened sides 13 and 14 thereof are juxtaposed and the flattened walls of the tubing between the laterally spaced pairs of electrodes are in substantial juxtaposition, holding the flattened tubing between the said spaced pairs of electrodes under sufficient pressure to maintain the said tubing completely flattened, and then applying a welding current W to said pairs of laterally spaced electrodes, one side of the said welding current W being applied to the stationary and movable electrodes 11 and 12 of each pair of laterally spaced electrodes as indicated by the dot and dash lines 15 in Fig. 5, the welding current employed being sufficient to heat the flattened tubing between said pairs of electrodes to part the same without substantial flash whereupon the flattened cut-off ends 100 of the said tubing become fused or welded closed, and become pressure tight at 101.

Because of the fact that a different welding current W is required for each different size and/or wall thickness of tubing 10 and for tubing of different metallurgical characteristics, it is not possible to disclose any formula for the determination of the proper welding current to be employed in each different instance. However, it is preferable to use a welding current source that has an infinite or fine step adjustment of the current input to the welding transformer employed so that, when any particular job of tube cut-off and sealing is set-up, the welding current W may first be adjusted so that substantially no flash is emitted during the parting by melting of the flattened portion of the tube 10 between the laterally spaced pairs of electrodes 11 and 12, and, if the closure 101 of the cut-off ends 100 of the tubing 10 are not pressure tight, the welding current W should be increased slightly until a pressure tight seal is accomplished during subsequent cut-offs. Once the welding current is properly adjusted according to the hereinabove teachings, the subsequent cut-offs for like tubing are uniformly and positively pressure sealed.

It has been found that, by maintaining the welding current W at a point where a relatively slow melting of the tubing occurs between the laterally spaced pairs of electrodes 11 and 12, any vigorous flashing away of molten metal at the cut-off ends 100 of the tubing 10 is prevented, and, a pressure tight closure thereat is accomplished.

In some instances with some types of metal tubing to be cut-off and sealed in accordance herewith, a relatively shallow transverse scoring of the tubing 10 centrally between the said laterally spaced pairs of electrodes is preferable. The dot and dash lines 16 in Fig. 1 indicate a preferred location of such scoring which may be accomplished either before or after the tubing 10 is flattened.

Although but one method of electrically cutting-off of tubing has been disclosed herein, it is obvious that many alterations may be made in the specific details of the several method steps employed, all without departing from the spirit and scope of the invention as defined by the appended claims.

I claim:

1. The method of cutting-off tubing and simultaneously sealing the cut-off ends thereof comprising the steps of placing the tubing between laterally spaced pairs of electrodes, flattening the tubing between said electrodes with sufficient pressure to bring the walls thereof into pressurized juxtaposition between the electrodes of each pair of electrodes and in substantial juxtaposition between the said spaced pairs of electrodes, holding said pressure on said spaced pairs of electrodes, and simultaneously applying a welding current through said laterally spaced pairs of electrodes and the tubing therebetween with one side of said welding current connected to each pair of electrodes, the welding current so applied being sufficient to melt the tubing between said spaced pairs of electrodes without substantial or vigorous flash.

2. The method defined in claim 1 wherein the tubing is scored transversely at a preferred cut-off point in the space between said laterally spaced pairs of electrodes prior to the application of welding current to said pairs of electrodes.

References Cited in the file of this patent

UNITED STATES PATENTS

| | | |
|---|---|---|
| 396,014 | Thomson | Jan. 8, 1889 |
| 2,056,398 | Herzog | Oct. 6, 1936 |
| 2,057,969 | Payson et al. | Oct. 20, 1936 |
| 2,538,571 | Kock | Jan. 16, 1951 |

FOREIGN PATENTS

| | | |
|---|---|---|
| 490,586 | Great Britain | Aug. 17, 1938 |